United States Patent
Suryanarayan et al.

(10) Patent No.: US 10,146,791 B2
(45) Date of Patent: Dec. 4, 2018

(54) OPEN FILE REBALANCE

(75) Inventors: Amar Tumballi Suryanarayan, Karnataka (IN); Shishir Nagaraja Gowda, Karnataka (IN); Anand Vishweswaran Avati, Karnataka (IN)

(73) Assignee: Red Hat, Inc., Raleigh, NC (US)

( * ) Notice: Subject to any disclaimer, the term of this patent is extended or adjusted under 35 U.S.C. 154(b) by 163 days.

(21) Appl. No.: 13/607,545

(22) Filed: Sep. 7, 2012

(65) Prior Publication Data
US 2014/0074785 A1    Mar. 13, 2014

(51) Int. Cl.
*G06F 17/30* (2006.01)
(52) U.S. Cl.
CPC .............................. *G06F 17/30194* (2013.01)
(58) Field of Classification Search
CPC ........... G06F 17/30067; G06F 11/1076; G06F 3/0637; G06F 21/6218; G06F 3/0643; G06F 8/65; G06F 2009/4557; G06F 11/2038; G06F 17/30156; G06F 21/31; G06F 12/0866; H04L 29/06
See application file for complete search history.

(56) References Cited

U.S. PATENT DOCUMENTS

| 6,611,848 B1* | 8/2003 | Bradley | 707/690 |
|---|---|---|---|
| 7,418,439 B2 | 8/2008 | Wong | |
| 7,668,881 B1* | 2/2010 | Hoffmann et al. | 707/756 |
| 7,937,453 B1* | 5/2011 | Hayden | G06F 17/30203 707/607 |
| 8,204,871 B1* | 6/2012 | Pawar | G06F 17/30132 707/639 |
| 2002/0019923 A1* | 2/2002 | Reuter | G06F 3/0605 711/206 |
| 2008/0294703 A1* | 11/2008 | Craft | G06F 17/30067 |
| 2009/0049047 A1* | 2/2009 | Battepati et al. | 707/9 |
| 2010/0005072 A1* | 1/2010 | Pitts | 707/3 |
| 2012/0054409 A1* | 3/2012 | Block | G06F 11/1484 711/6 |
| 2012/0066179 A1* | 3/2012 | Saika | G06F 3/061 707/634 |
| 2012/0215970 A1* | 8/2012 | Shats | G06F 12/0866 711/103 |
| 2012/0233436 A1* | 9/2012 | Eguchi | 711/170 |
| 2013/0014103 A1* | 1/2013 | Reuther | G06F 3/0647 718/1 |
| 2013/0311616 A1* | 11/2013 | Wang | G06F 17/302 709/219 |

* cited by examiner

Primary Examiner — Mariela Reyes
Assistant Examiner — Courtney Harmon
(74) Attorney, Agent, or Firm — Lowenstein Sandler LLP

(57) ABSTRACT

A processing device receives a request for access to a source file that is stored in an initial location in a file system. The processing device determines that the source file is associated with a migration to a new location. The processing device reads the source file from the initial location if the request is a read request and writes to the source file at the initial location and writes to a destination file at the new location if the request is a write request.

15 Claims, 7 Drawing Sheets

OPEN FILE REBALANCE

TECHNICAL FIELD

The present disclosure relates to rebalancing files, and more particularly, to rebalancing open files.

BACKGROUND

Data may be stored in a structured data format, such as in a database, and/or data may be stored as unstructured data, for example, in files and folders in a digital file system. A distributed file system can organize data (e.g., data files) in the disks using volumes. A volume is a single accessible storage area of the file system, which can be resident on a single partition of a hard disk (e.g., disks) of the file system. A volume can be a representation of a logical location, rather than a physical location, of a storage area in the file system. For example, physical hard disk-1 may have two partitions, partition-1 and partition-2. A volume label "C:" may be assigned to partition-1 and a volume label "D:" may be assigned to partition-2. Hard disk-1 is a physical disk and "C:" and "D:" are volumes representing logical locations on physical hard disk-1. The volumes in the distributed file system can be expanded. For example, one or more sub-volumes can be added to a volume to add to the capacity of the volume. After expanding a volume, the data (e.g., files) can be rebalanced amongst the storage servers. The data (e.g., files) can be migrated from one sub-volume to another sub-volume.

Some files may be open, for example, for access to client applications. Traditionally, rebalancing solutions may ignore any file that is open during the rebalancing. If a file is open, conventional rebalancing solutions may exclude the open files from the rebalance process all together and/or wait until the files are closed.

BRIEF DESCRIPTION OF THE DRAWINGS

The present disclosure will be understood more fully from the detailed description given below and from the accompanying drawings of various implementations of the disclosure.

DETAILED DESCRIPTION

Described herein are a method and apparatus for migrating an open file and an open file descriptor, according to various implementations. After expanding a volume in a file system, the files in the file system can be rebalanced among the sub-volumes (e.g., existing sub-volumes, newly added sub-volumes). Rebalancing refers to evenly distributing the files amongst the sub-volumes (e.g., existing sub-volumes, newly added sub-volumes) to improve scalability and performance of the file system. A file that is to be migrated may be open, for example, for access for a client application. Implementations can include a rebalance module, which is described in greater detail below, that may be hosted on a storage server machine to migrate an open file and a file descriptor for the open file from one sub-volume to another sub-volume. Implementations can also include a client distribution module, which is described in greater detail below, that may be hosted on a client machine to access the open file that is associated with the migration, for example, during the migration and when the migration is complete. For example, the client distribution module may receive a request for access to a source file that is stored in an initial location in a file system. The request may be from a client application. The client distribution module may determine that the source file is associated with a migration to a new location. The client distribution module may read the source file from the initial location if the request is a read request. The client distribution module may write to both the source file at the initial location and to a destination file at the new location if the request is a write request.

Figure 1:
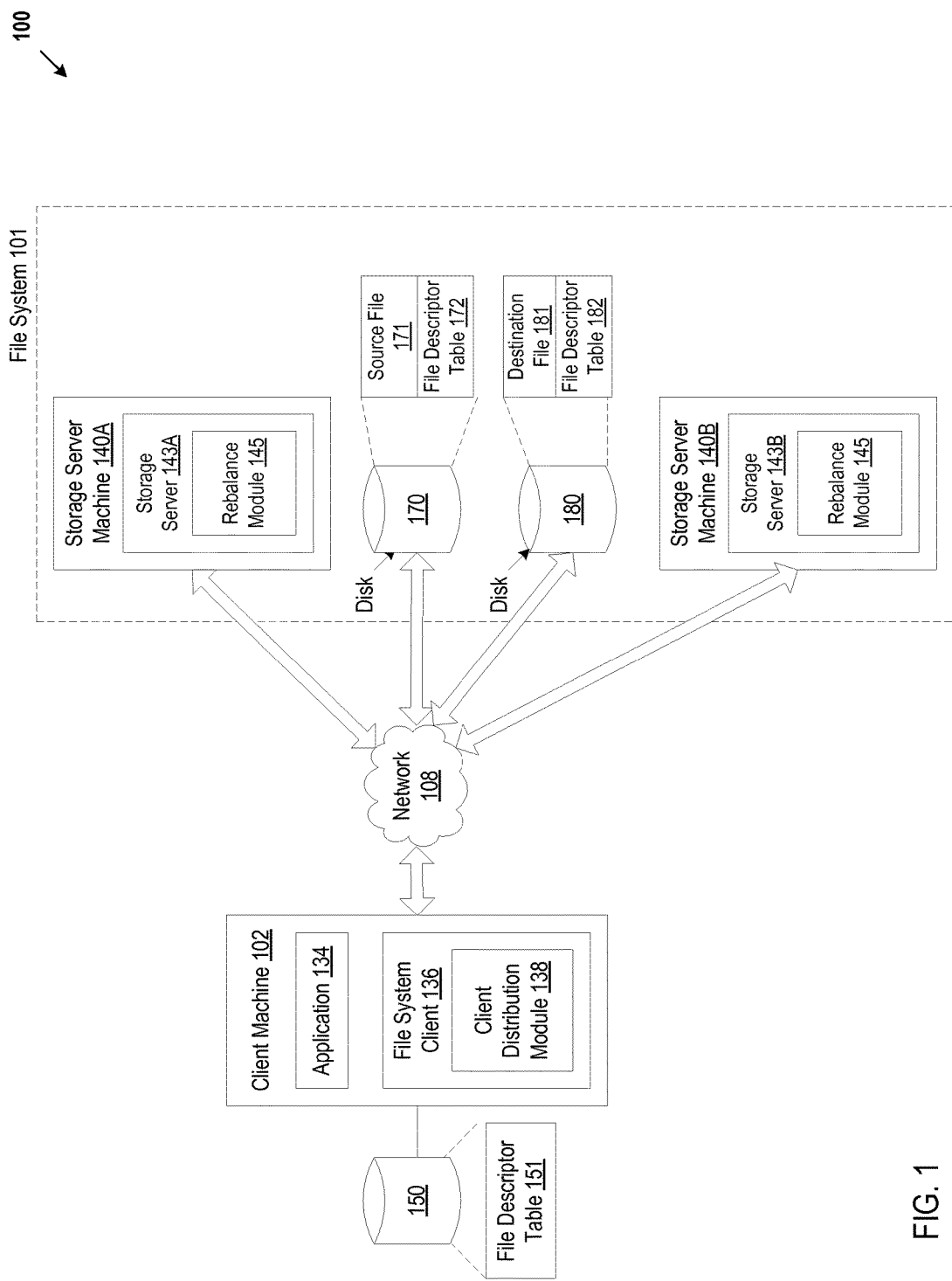
FIG. 1 illustrates an example system architecture, in accordance with various implementations.

FIG. 1 is an example system architecture 100 for various implementations. The system architecture 100 can include a distributed file system 101 coupled to one or more client machines 102 via a network 108. The network 108 may be a public network, a private network, or a combination thereof. Network 108 can include a wireless infrastructure. The wireless infrastructure may be provided by one or multiple wireless communications systems, such as a wireless fidelity (WiFi) hotspot connected with the network 108 and/or a wireless carrier system that can be implemented using various data processing equipment, communication towers, etc.

The distributed file system 101 can be a network attached storage file system that includes one or more storage server machines 140A-B and any number of mass storage devices, such as magnetic or optical storage based disks 170A-B, solid-state drives (SSDs) or hard drives, coupled to the storage server machines 140A-B via the network 108. A storage server machine 140A-B can include a network-accessible server-based functionality (e.g., storage server 143A-B) or other data processing equipment. The storage server machines 140A-B can include, and are not limited to, any data processing device, such as a desktop computer, a laptop computer, a mainframe computer, a personal digital assistant, a server computer, a handheld device or any other device configured to process data.

The distributed file system 101 can store data as files 171 and can include directories, also referred to as folders, which are virtual containers within the file system 101, in which groups of computer files 171 and possibly other directories can be kept and organized. Related files 171 can be stored in the same directory. A sub-directory, also referred to as a sub-folder, is a directory contained inside another directory. The top-most directory is referred to as a root or top-level directory within the file system 101. Together, the directories form a hierarchy, or tree structure of one or more levels in the file system 101. The distributed file system can include one or more clusters. A cluster is a group of linked storage servers 143A-B working together closely.

Any number of client machines 102 can include a file system client 136 to communicate with the storage servers 143A-B in the file system 101. The client machine 102 may a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. The file system client 136 can mount the file system 101 via a mount point to access the data in the file system 101. For example, the file system client 136 may be configured to mount the file system 101 using a volume identifier (e.g., volume label) and a file path that is stored in configuration data. The client machines 102 can host one or more applications 134. An application 134 can be any type of application including, for example, a web application, a desktop application, a browser application, etc. An application 134 may request access (e.g., read, write, etc.) to the data in the file system 101 via the mount point and the file system client 136.

When a file is opened, the associated storage server 143A-B and file system client 136 can create an open file descriptor (fd) for the open file. A file descriptor can be an index for an entry in a kernel-resident data structure containing the details of the open files associated with the machine. In POSIX (portable operating system interface) the data structure may be a file descriptor table, and each storage server 143A-B can have its own file descriptor table 172,182 for open files. For example, the storage server 143A can store a server-side file descriptor table 172 that includes a file descriptor for a source file 171 that has been opened, for example, for a client application 134 via the file system client 136. The client machines 102 can also store a client-side file descriptor table 151 in a data store 150 that is coupled to the client machine 102. The client-side file descriptor table 151 can include a file descriptor for the file (e.g., source file 171) that has been opened. A file descriptor can be an abstract indicator for accessing a file (e.g., source file 171). File descriptors can be small integers corresponding to a file (e.g., source file 171) that has been opened for a process (e.g., client application 134). For example, standard input can be represented by a file descriptor "0", standard output can be represented by a file descriptor "1", and standard error can be represented by a file descriptor "2".

The distributed file system 101 can organize data (e.g., source files 171) in the disks 170,180 using volumes. A volume is a single accessible storage area of the file system 101, which can be resident on a single partition of a hard disk (e.g., disks 170,180) of the file system 101. A volume can be a representation of a logical location, rather than a physical location, of a storage area in the file system 101. For example, physical hard disk-1 may have two partitions, partition-1 and partition-2. A volume label "C:" may be assigned to partition-1 and a volume label "D:" may be assigned to partition-2. Hard disk-1 is a physical disk and "C:" and "D:" are volumes representing logical locations on physical hard disk-1.

The volumes in the distributed file system 101 can be expanded. A mounted directory, also referred to as a brick, can be a basic unit of storage, represented by an export directory on a storage server 143A-B. A brick can be assigned to a volume. When a brick is processed, for example, by a translator, which can configure the brick, the brick becomes a sub-volume. A brick (sub-volume) can be described using a server identifier with an export directory identifier. One or more bricks (sub-volumes) can be added to a volume to increase the distribution of data amongst volumes and/or sub-volumes and to add to the capacity of the volume.

When a volume is expanded, the data (e.g., source files 171) in the file system 101 can be rebalanced amongst the sub-volumes (e.g., existing sub-volumes, new sub-volumes) on the disks 170,180. One or more storage servers 143A-B can include a rebalance module 145 to migrate files (e.g., source files 171), including open files, and file descriptors in file descriptor tables 172 for the open files (e.g., source files 171) from an initial location (e.g., existing sub-volume) to a new location (e.g., existing sub-volume, new sub-volume) to rebalance the data. Implementations of the rebalance module migrating open files and file descriptors for the open files are described in greater detail below in conjunction with FIG. 3 and FIG. 4.

The file system clients 136 in the client machines 102 can include a client distribution module 138 to access the open files (e.g., source files 171, destination files 181) while the files are being migrated and to access the destination file 181 when the migration is complete. The client distribution module 138 can read a source file 171 from an initial location while the source file 171 is in migration, can write to the source file 171 at the initial location and write to the destination file 181 at the new location during the migration, and can read from and write to the destination file 181 at the new location when the migration is complete. Implementations of the client distribution module migrating accessing files associated with migration are described in greater detail below in conjunction with FIG. 5 and FIG. 6.

The data store 150 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 2:
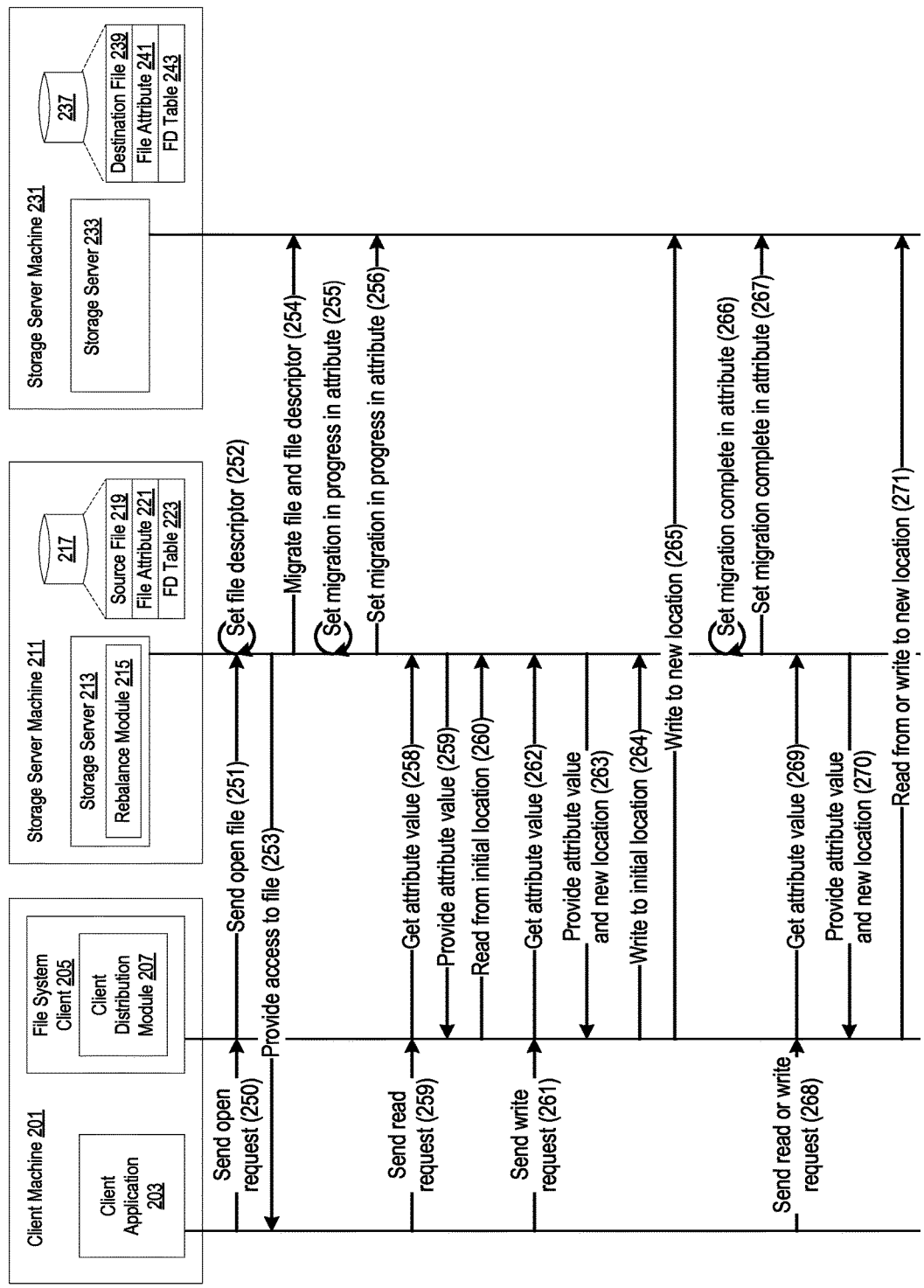
FIG. 2 is a block diagram of an implementation of a storage server migrating an open file and a file descriptor for the open file.

FIG. 2 illustrates a block diagram of one implementation for migrating an open file and an open file descriptor and accessing the open file during migration. A client application 203 on a client machine 201 may wish to perform an operation (e.g., read, write, etc.) on a file, such as source file 219 stored at storage server machine 211 in data store 217. The data store 217 can be mass storage devices, such as magnetic or optical storage based disks, solid-state drives (SSDs) or hard drives.

The client application can send (250) a request to the file system client 205 on the client machine 201 for access to the source file 219. The file system client 205 can mount the file system that includes the storage server machine 211 and can send (251) an open request for the source file 219 to the storage server 213. The storage server 213 can set (252) the file descriptor for the source file 219 in the file descriptor (FD) table 223 in the data store 217 to indicate that the source file 219 is open. The storage server 213 can provide (253) access to the source file 219 to the client application 203.

The rebalance module 215 on a storage server, such as storage server 213, may start a migration process, in response to a volume being expanded, to migrate the source file 219 from the initial location (e.g., existing sub-volume in data store 217), to a new location. The migration process can include creating a copy of the source file 219 at the new location. The copy is herein after referred to as the destination file (e.g., destination file 239). The new location can be an existing sub-volume or a newly added sub-volume. For example, the new location may be a new sub-volume at storage server machine 231 in data store 237 managed by storage server 233. The data store 237 can be mass storage devices, such as magnetic or optical storage based disks, solid-state drives (SSDs) or hard drives.

The rebalance module 215 can migrate (254) the source file 219 and the file descriptor for the source file 219 by creating destination file 239 at the new location (e.g., sub-volume in data store 237) and a file descriptor for the destination file 239 in the file descriptor table 243 at the new location. The file descriptor for the destination file 239 can have the same value as the file descriptor for the source file 219.

When the migration process starts, the rebalance module 215 can set one or more file attributes in each file (e.g., source file 219, destination file 239) to indicate a state or mode describing whether the file is under migration or if the migration is complete. For example, the rebalance module 215 may set (255) the file attribute 221 for the source file 219 to indicate the migration is in progress. The rebalance module 215 may set (256) the file attribute 241 for the destination file 239 to indicate the migration is in progress. The rebalance module 215 can also include a pointer in an extended attribute for the source file 219 that points to the location of the destination file 239. One implementation of including a pointer in an extended attribute for the source file is described in greater detail below in conjunction with FIG. 6.

The client application 203 may send (259) a request to read the source file 219 via the file system client 205. The client distribution module 207 can get (258) the file attribute 221 value for the source file 219 from the storage server 213 to determine the migration state of the source file 219. In one implementation, the client distribution module 207 also gets the file attribute value for the destination file to determine the migration state and/or location of the destination file. The storage server 213 can provide (259) the value of the file attribute 221 to the client distribution module 207. The file attribute 221 may indicate that the source file 219 is under migration and the client distribution module 207 can perform the read operation (260) from the initial location of the source file 219 at storage server 213 in data store 217.

The client application 203 may send (261) a request to write to the source file 219 via the file system client 205. The client distribution module 207 can get (262) the file attribute 221 value for the source file 219 from the storage server 213 to determine the migration state of the source file 219. In one implementation, the client distribution module 207 also gets the file attribute value for destination file to determine the migration state and/or location of the destination file. The storage server 213 can provide (263) the value of the file attribute 221 and a pointer to the new location (e.g., data store 237) of the destination file 239 to the client distribution module 207. The file attribute 221 may indicate that the source file 219 is under migration and the client distribution module 207 can perform the write operation (264) using the source file 219 at the initial location at storage server 213 in data store 217 and can also perform the write operation (265) using the destination file 239 at the new location at storage server 233 in data store 237. The client distribution module 207 can write to both the source file 219 and the destination file 239 to ensure data consistency between the two files.

When the migration is complete, the rebalance module 215 can set one or more file attributes in each file (e.g., source file 219, destination file 239) to indicate that the state or mode for the corresponding file is migration is complete. For example, the rebalance module 215 may set (266) the file attribute 221 for the source file 219 to indicate that the migration is complete. The rebalance module 215 may set (267) the file attribute 241 for the destination file 239 to indicate that the migration is complete. The rebalance module 215 can also include a pointer in an extended attribute for the destination file 239 to point to itself. The rebalance module 215 can also truncate the source file 219 to a file size of zero to indicate that the source file has no data. One implementation of truncating the source file is described in greater detail below in conjunction with FIG. 6.

The client application 203 may send (268) a request to read from or write to the source file 219 via the file system client 205. The client distribution module 207 can get (269) the file attribute 221 value for the source file 219 from the storage server 213 to determine the migration state of the source file 219. In one implementation, the client distribution module 207 also gets the file attribute value for destination file to determine the migration state and/or location of the destination file. The storage server 213 can provide (270) the value of the file attribute 221 and a pointer to the new location (e.g., data store 237) of the destination file 239 to the client distribution module 207. The file attribute 221 may indicate that the source file 219 has completed a migration and the client distribution module 207 can perform the read or write operation (271) using the destination file 239 at the new location at storage server 233 in data store 237.

Figure 3:
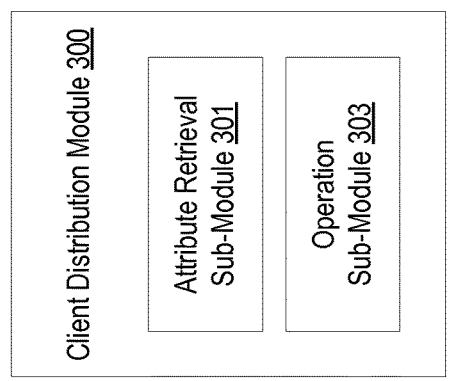
FIG. 3 is a block diagram of an implementation of a client distribution module.

FIG. 3 illustrates a block diagram of one implementation of a client distribution module 300. The client distribution module 300 may correspond to a client distribution module 138 in a client machine 102 of FIG. 1. The client distribution module 300 can include a migration state retrieval sub-module 301 and an operation sub-module 303. Note that in alternative implementations, the functionality of one or more of the sub-modules can be combined or divided.

The migration state retrieval sub-module 301 can determine the migration state of a file that is stored in the file system. An operating system can have special attributes associated with the files. The migration state retrieval sub-module 301 can read a file attribute of the file to determine the migration state of the file. For example, the file attributes may be the 'postbuf' attributes of the file. The file attributes can be bits which can be used to set the permissions for a file. For example, the files (e.g., source files, destination files) can have attributes, known as mode bits, which can include a "SGID" (set group identifier) bit and a "sticky" bit. The bits can describe the permissions (e.g., read, write, etc.) of the file (e.g., source file, destination file). For example, the migration state retrieval sub-module 301 may read the SGID bit and a sticky bit. The migration state retrieval sub-module 301 can also determine the new location of the destination file using an extended attribute of the source file and/or an extended attribute for the destination file. The source file and the destination file can include a link attribute, which includes a pointer to the file location.

The operation sub-module 303 can perform a file operation (e.g., read, write, stat, etc.) using the source file and/or the destination file based on the migration state of the source file. The operation sub-module 303 can use the link attribute value (e.g., pointer) to access a file accordingly. For example, if the migration state of the source file indicates that the source file is under migration, the operation sub-module 303 can read from the source file at the initial location. If the migration state of the source file indicates that the source file is under migration, the operation sub-module 303 can write to the source file at the initial location and write to the destination file at the new location to ensure data consistency between the source file and the destination file. If the migration state of the source file indicates that the migration is complete, the operation sub-module 303 can read from and/or write to the destination file at the new location.

Figure 4:
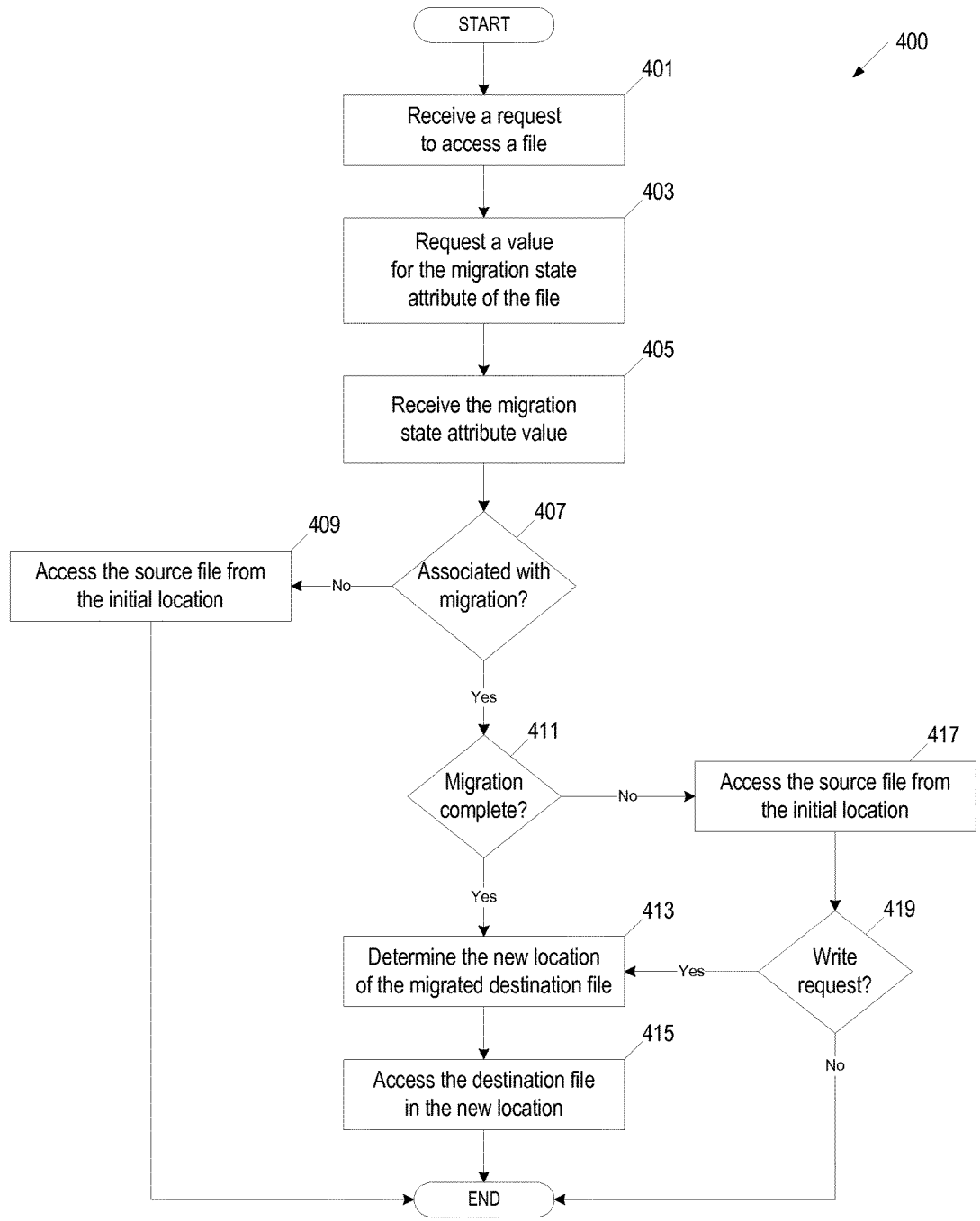
FIG. 4 is a flow diagram illustrating an implementation for a method for accessing an open file associated with migration.

FIG. 4 is a flow diagram of an implementation of a method 400 for accessing an open file associated with migration. Method 400 can be performed by processing logic that can comprise hardware (e.g., circuitry, dedicated logic, programmable logic, microcode, etc.), software (e.g., instructions run on a processing device), or a combination thereof. In one implementation, method 400 is performed by a client distribution module 138 in a client machine 102 of FIG. 1.

At block 401, processing logic (e.g., client distribution module) receives a request to access a file. The request can be from a client application. At block 403, processing logic requests a value for the migration state attribute of the file. Processing logic can fetch the permissions (e.g., SGID and sticky bit values) in a callback, which is executable code that is passed as a parameter to other code. At block 405, processing logic receives the migration state attribute value and determines from the value whether the file is associated with a migration at block 407. For example, the file may be undergoing a migration or the migration may be complete. For example, processing logic can look at the permissions from the returned bit values (e.g., SGID bit and sticky bit) in the callback and determine whether the file is undergoing a migration. In one implementation, the client distribution module 207 also gets the file attribute value for destination file to determine the migration state and/or location of the destination file.

If the file is not under migration (block 407), processing logic accesses the source file from its initial location. For example, processing logic can read the source file from its initial location or write to the source file in its initial location. If the file is under migration (block 407), processing logic determines whether the migration is complete (block 411). For example, processing logic can look at the permissions from the returned bit values (e.g., SGID bit and sticky bit) in the callback and determine whether the migration is complete. If the migration is complete (block 413), processing logic determines the new location of the migrated file at block 413. Processing logic can query a link attribute of the source file that contains a pointer to the location of the destination file. The location may be an existing sub-volume or a new sub-volume.

At block 415, processing logic accesses the destination file in the new location using the pointer. If the migration is not complete (block 413), processing logic accesses the source file from its initial location. For example, processing logic can read the source file from its initial location or write to the source file in its initial location. At block 419, if the request is write request, processing logic also writes to the destination file in the new location.

Figure 5:
FIG. 5 is a block diagram of an implementation of a rebalance module.

FIG. 5 illustrates a block diagram of one implementation of a rebalance module 500. The rebalance module 500 may correspond to a rebalance module 145 in a storage server machine 140A,B of FIG. 1. The rebalance module 500 can include a migration sub-module 501 and an attribute manager sub-module 503. Note that in alternative implementations, the functionality of one or more of the sub-modules can be combined or divided.

The migration sub-module 501 can use one or more algorithms to determine how to rebalance files amongst sub-volumes. The migration sub-module 501 can use one or more algorithms to identify a source file and a file descriptor for the source file to migrate from an initial location to a new location. For example, files may be stored on four existing sub-volumes (e.g., sub-volume-1, sub-volume-2, sub-volume-3, and sub-volume-4) and four new sub-volumes (e.g., sub-volume-5, sub-volume-6, sub-volume-7, and sub-volume-8) may be added. The migration sub-module 501 can use an algorithm to determine that File-1 may be migrated from the existing sub-volume-1 to a new destination at existing sub-volume-2. In another example, File-1 may be migrated from the existing sub-volume-1 to a new destination at new sub-volume-4.

The attribute manager sub-module 503 can set the permissions of the source file and the destination file to indicate the migration state of the files. Examples of the migration state can include, and are not limited to, migration in progress (also referred to as "under migration") and migration complete. For example, the attribute manager sub-module 503 can set the SGID and sticky bits for the source file and the destination file to indicate that the files are under migration. The attribute manager sub-module 503 can overload the 'postbuf' attribute in a callback function to indicate whether the file is under migration or if the migration has completed.

The attribute manager sub-module 503 can also include a link extended attribute for the source file and destination file to point to location. For example, the attribute manager sub-module 503 can include a link extended attribute for the source file to point to the location of the destination file that corresponds to the source file.

Figure 6:
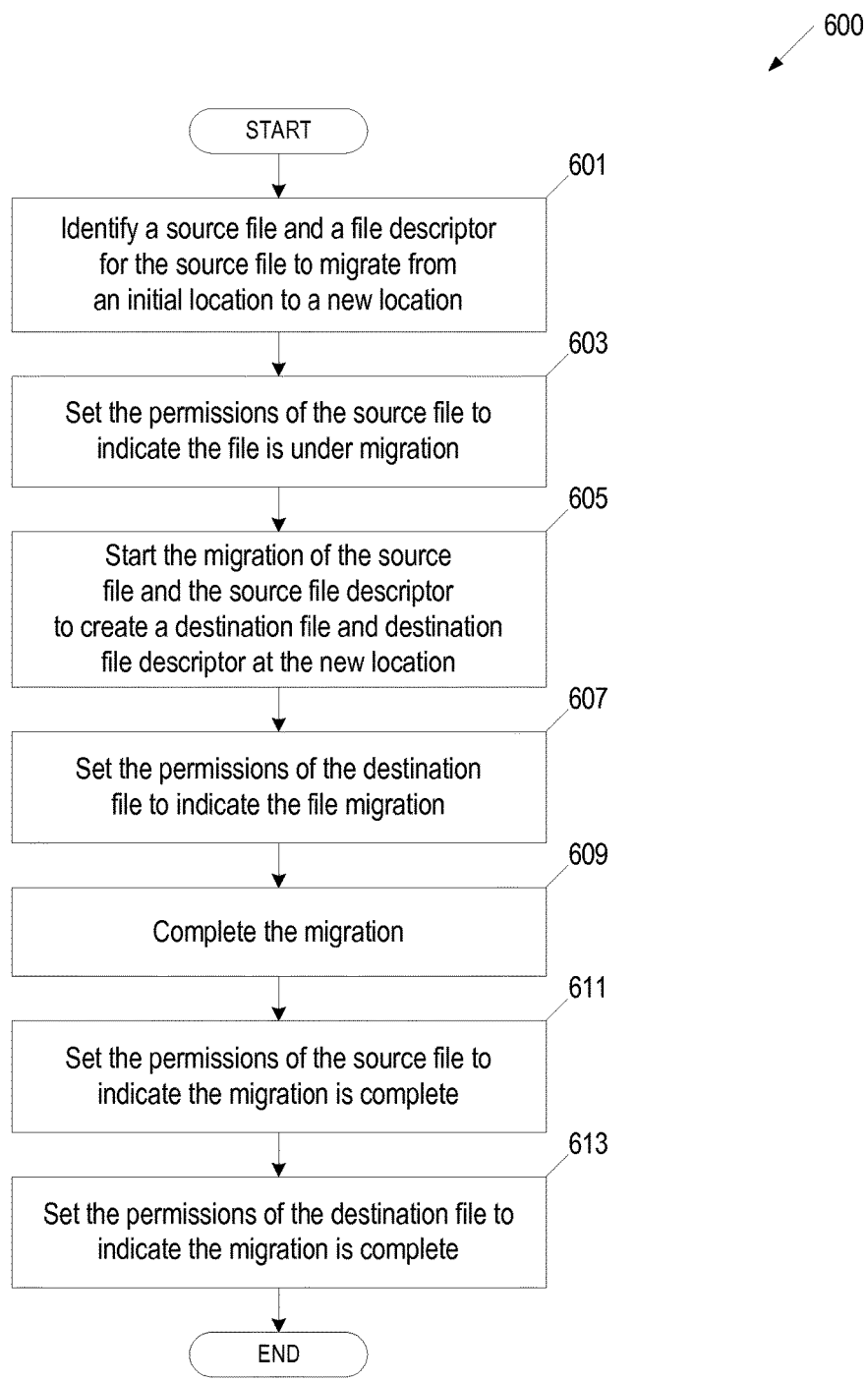
FIG. 6 is a flow diagram illustrating an implementation for a method for migrating an open file and a file descriptor for the open file.

FIG. 6 is a flow diagram of an implementation of a method 600 for migrating an open file and a file descriptor for the open file. Method 600 can be performed by processing logic that can comprise hardware (e.g., circuitry, dedicated logic, programmable logic, microcode, etc.), software (e.g., instructions run on a processing device), or a combination thereof. In one implementation, method 600 is performed by a rebalance module 145 in a storage server machine 140A,B of FIG. 1.

At block 601, processing logic identifies a source file and a file descriptor for the source file to migrate from an initial location to a new location. Processing logic can use one or more algorithms to determine how to rebalance files amongst sub-volumes. At block 603, processing logic sets the permissions of the source file to indicate that the file is under migration. For example, processing logic can set the SGID and sticky bits for the source file to indicate the file is under migration. Processing logic can overload the 'postbuf' attribute in a callback function to indicate whether the file is under migration or if the migration has completed. Processing logic can also include a link extended attribute for the source file to point to the location of the destination file that corresponds to the source file.

At block 605, processing logic starts the migration of the source file and the source file descriptor to create a destination file and a destination file descriptor at the new location. At block 607, processing logic sets the permissions of the destination file to indicate the destination file is part of a migration process. For example, processing logic can set the mode bits (e.g., SGID bit and sticky bit) for the destination file to "01000" to indicate that the destination file has no data and/or is under migration. Processing logic can also set the link extended attribute for the destination file to include a pointer to itself.

At block 609, processing logic completes the migration and sets the permissions of the source file to indicate that the file migration is complete at block 611. For example, processing logic can remove data from the source file, for example, by setting the mode bits (e.g., SGID bit and sticky bit) to "01000" to indicate that the source file has no data and/or that migration is complete. Processing logic can also truncate the source file to file size of "0" to indicate that the source file has no data.

At block 613, processing logic detects the permissions of the destination file to indicate that the file migration is complete. For example, processing logic can set the mode bits (e.g., SGID bit and sticky bit) for the destination file to indicate that the migration is complete. For example, processing logic may not set the SFID bit and the sticky bit. Processing logic can also remove the pointer in the link extended attribute.

Figure 7:
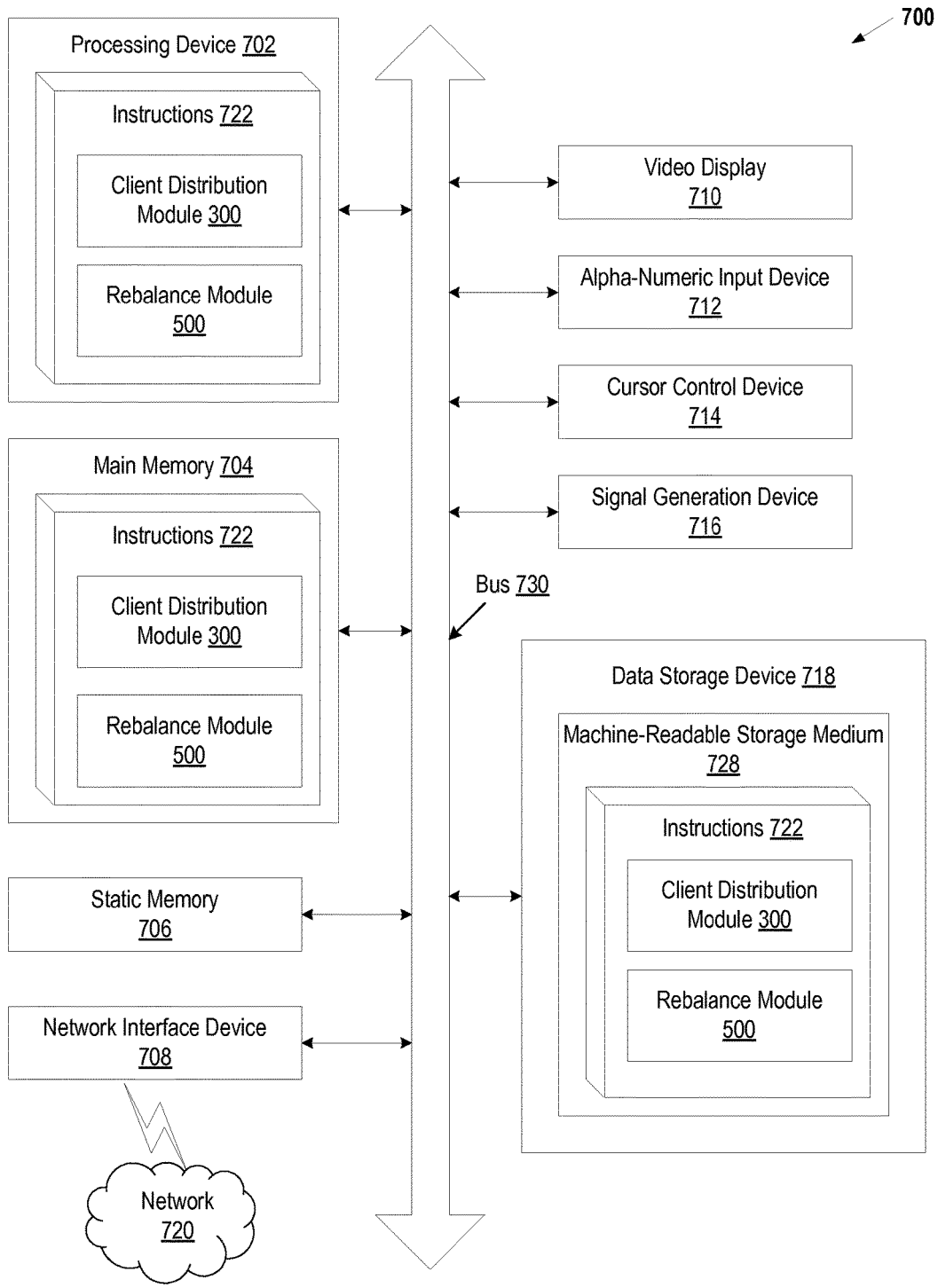
FIG. 7 is a block diagram of an example computer system that may perform one or more of the operations described herein.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 702 is configured to execute instructions 722 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-readable storage medium 728 (also known as a computer-readable medium) on which is stored one or more sets of instructions or software 722 embodying any one or more of the methodologies or functions described herein. The instructions 722 may also reside, completely or at least partially, within the main memory 704 and/or within the processing device 702 during execution thereof by the computer system 700, the main memory 704 and the processing device 702 also constituting machine-readable storage media.

In one implementation, the instructions 722 include instructions for a client distribution module and/or a rebalance module (e.g., client distribution module 300 of FIG. 3, rebalance module 500 of FIG. 5) and/or a software library containing methods that call modules in a client distribution module and/or a rebalance module. While the machine-readable storage medium 528 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "determining" or "reading" or "identifying" or "writing" or "setting" or "creating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   responsive to opening a file to rebalance between a first location and a second location in a file system, creating, by a processing device, a first file descriptor for the file, the first file descriptor being a first index to a first entry in a first kernel-resident file descriptor table;
   associating the first file descriptor with a first value to indicate that the file is a first file;
   migrating, by the processing device, the file from the first location to the second location in the file system by creating a second file at the second location, the second file being a copy of the first file;
   creating, by the processing device, a second file descriptor for the second file, the second file descriptor being a second index to a second entry in a second kernel-resident file descriptor table;
   setting a first file attribute value in the first file descriptor and a second file attribute value in the second file descriptor to indicate that a migration is in progress;
   providing, by the processing device before the migration is complete, access to an application to write data to the first file at the first location and the second file at the second location in view of the first attribute value and the second file attribute value; and
   responsive to receiving a request from the application to read data of the file at the second location before the migration is complete, generating, by the processing device in view the first file descriptor and the second file descriptor, an indicator to direct the application to the first location for access to the data.

2. The method of claim 1, wherein the first file descriptor and the second file descriptor are integers.

3. The method of claim 1, wherein the first location is a first sub-volume in the file system, and migrating the first file descriptor from the first location to the second location comprises:
   creating the second file descriptor in a second sub-volume in the file system.

4. The method of claim 1, wherein the first kernel-resident file descriptor table and the second kernel-resident file descriptor table comprise information of respective open files.

5. The method of claim 1, further comprising:
   setting the first file attribute value and the second file attribute value to indicate migration is complete.

6. A non-transitory computer-readable storage medium including instructions that, when executed by a processing device, cause the processing device to:
   responsive to opening a file to rebalance between a first location and a second location in a file system, create a first file descriptor for the file, the first file descriptor being a first index to a first entry in a first kernel-resident file descriptor table;
   associate the first file descriptor with a first value to indicate that the file is a first file;
   migrate the file from the first location to a second location in the file system by creating a second file at the second location, the second file being a copy of the first file;
   create, by the processing device, a second file descriptor for the second file, the second file descriptor being a second index to a second entry in a second kernel-resident file descriptor table;
   set a first file attribute value in the first file descriptor and a second file attribute value in the second file descriptor to indicate that a migration is in progress;
   provide, before the migration is complete, access to an application to write data to the first file at the first location and the second file at the second location in view of the first attribute value and the second file attribute value; and
   responsive to receiving a request from the application to read data of the file at the second location before the migration is complete, generate, in view the first file descriptor and the second file descriptor, an indicator to direct the application to the first location for access to the data.

7. The non-transitory computer-readable storage medium of claim 6, wherein the first file descriptor and the second file descriptor are integers.

8. The non-transitory computer-readable storage medium of claim 6, wherein the first location is a first sub-volume in the file system, and to migrate the first file descriptor from the first location to the second location, the processing device is to:
   create the second file descriptor in a second sub-volume in the file system.

9. The non-transitory computer-readable storage medium of claim 6, wherein the first kernel-resident file descriptor table and the second kernel-resident file descriptor table comprise information of respective open files.

10. The non-transitory computer-readable storage medium of claim 6, wherein the processing device is further to:
    set the first file attribute value and the second file attribute value to indicate migration is complete.

11. A system comprising:
a memory; and
a processing device, operatively coupled to the memory, to:
responsive to opening a file to rebalance between a first location and a second location in a file system, create a first file descriptor for the file, the first file descriptor being a first index to a first entry in a first kernel-resident file descriptor table;
associate the first file descriptor with a first value to indicate that the file is a first file;
migrate the file from the first location to a second location in the file system by creating a second file at the second location, the second file being a copy of the first file;
create a second file descriptor for the second file, the second file descriptor being a second index to a second entry in a second kernel-resident file descriptor table;
set a first file attribute value in the first file descriptor and a second file attribute value in the second file descriptor to indicate that a migration is in progress;
provide, before the migration is complete, access to an application to write data to the first file at the first location and the second file at the second location in view of the first attribute value and the second file attribute value; and
responsive to receiving a request from the application to read data of the file at the second location before the migration is complete, generate, in view the first file descriptor and the second file descriptor, an indicator to direct the application to the first location for access to the data.

12. The system of claim 11, wherein the first file descriptor and the second file descriptor are integers.

13. The system of claim 11, wherein the first location is a first sub-volume in the file system, and to migrate the first file descriptor from the first location to the second location, the processing device is to:
create the second file descriptor in a second sub-volume in the file system.

14. The system of claim 11, wherein the first kernel-resident file descriptor table and the second kernel-resident file descriptor table comprise information respectively of the first and second files.

15. The system of claim 11, wherein the processing device is further to:
set the first file attribute value and the second file attribute value to indicate migration is complete.

* * * * *